United States Patent [19]

Midogohchi et al.

[11] Patent Number: 5,483,012
[45] Date of Patent: Jan. 9, 1996

[54] ELECTRODEPOSITABLE COATING COMPOSITION

[75] Inventors: Susumu Midogohchi, Amagasaki; Masafumi Kume, Hiratsuka; Takahisa Kasukawa, Yokohama; Tetsuya Takasu, Kyoto; Hiroshi Nishimoto, Otsu, all of Japan

[73] Assignees: Kansai Paint Company Limited, Amagasaki; Sanyo Chemical Industries, Ltd., Higashiyama, both of Japan

[21] Appl. No.: 281,671

[22] Filed: Jul. 28, 1994

[30] Foreign Application Priority Data

Jul. 30, 1993 [JP] Japan .................................. 5-189753

[51] Int. Cl.⁶ .................................................. C08F 283/10
[52] U.S. Cl. ..................... 525/459; 204/181.4; 523/415
[58] Field of Search ........................... 525/459; 523/415; 204/181.4

[56] References Cited

U.S. PATENT DOCUMENTS

| | | |
|---|---|---|
| 4,070,258 | 1/1978 | McGinniss . |
| 4,147,679 | 4/1979 | Scriven et al. ........................... 523/415 |
| 4,761,337 | 8/1988 | Guagliardo et al. ..................... 525/453 |

FOREIGN PATENT DOCUMENTS

| | | |
|---|---|---|
| 0262069A2 | 3/1988 | European Pat. Off. . |
| 0319703A1 | 6/1989 | European Pat. Off. . |

OTHER PUBLICATIONS

Patent Abstracts of Japan, vol. 4, No. 89 (C-016), Jun. 25, 1980, and JP-A-55 052 359.

*Primary Examiner*—Melvyn I. Marquis
*Assistant Examiner*—D. Aylward
*Attorney, Agent, or Firm*—Armstrong, Westerman, Hattori, McLeland & Naughton

[57] ABSTRACT

This invention provides a cationic electrodepositable coating composition comprising:

(A) 30 to 1% by weight of a high-molecular-weight polyurethane resin prepared by reacting (a) an organic polyisocyanate, (b) a high-molecular-weight polyol, and (c) a diol having at least one tertiary amino group, the high-molecular-weight polyurethane resin (A) having a SP value of 9.5 to 12.0 and a number average molecular weight of at least 15,000; and (B) 70 to 99% by weight of an epoxy-type cationic electrodepositable resin.

12 Claims, No Drawings

ELECTRODEPOSITABLE COATING COMPOSITION

The present invention relates to a novel cationic electrodepositable coating composition which is capable of forming a coating film having a high chipping resistance and corrosion resistance.

In the field of motor vehicles, there has been an increasing need in recent years for improving the durability of automotive outer plates in a corrosive environment (e.g. roads sprinkled with rock salts in a cold climate). To meet the need, a corrosion-resistant, galvanized steel panels have been increasingly used as automotive body panels to replace the cold-rolled steel panels conventionally used.

On the other hand, automobiles running on a road are frequently exposed to high velocity flying debris such as rock salt particles, pebbles, etc. The collisions of debris with the coated substrate cause the paint to chip away at the point of impact, thereby exposing the underlying substrate. That is, a problem of so-called "chipping" is posed in this way. The coatings on automotive bodies become so hard and less elastic under a low-temperature environment as in a cold climate that the coatings are directly subjected by collision with debris to an impact with substantially no alleviation. As a result, coatings tend to peel off between the steel substrate and the layer formed by chemical conversion and between the steel substrate and the zinc layer. Currently an urgent demand has arisen for measures against the chipping problem under a low-temperature environment.

To resolve the chipping problem, a coating method has been proposed which comprises coating a substrate with an electrodepositable coating composition, and coating the coated substrate with a chipping sealer to form a coating having a low static glass transition temperature, followed by conventional application of intermediate and top coating compositions (e.g., Japanese Unexamined Patent Publication No. 65,765/1987). However, the thickness of the chipping sealer coating is preferably in the range of 3 to 10 μm, since a less thickness fails to impart satisfactory chipping resistance to the coating, and a more thickness is likely to afford a poor finish appearance. Moreover, the spray coating method conventionally used makes it difficult to control the application of sealer to such small thickness, thereby raising a problem on application of the chipping sealer on a mass production scale. The additional procedure of applying the chipping sealer is disadvantageous from the viewpoint of procedure saving and is uneconomical.

Also known are cationic electrodepositable coating compositions capable of imparting elasticity to coatings to improve the chipping resistance, the composition comprising a cationic water-dispersible resin, a urethane elastomer containing a blocked isocyanate group and having a molecular weight of 1,000 to 10,000 and a curing agent (e.g., Japanese Unexamined Patent Publication No. 52,359/1980). The proposed coating composition, however, has the drawback of producing coatings with unsatisfactory resistance to chipping and corrosion due to the poor compatibility of the water-dispersible resin with the urethane elastomer.

To produce a coating with elasticity and impact resistance, a cationic electrodepositable coating composition is known which contains an amine-epoxy resin adduct and a urethane resin adduct (U.S. Pat. No. 4,761,337). The proposed coating composition, however, is deficient. The urethane resin adducts specifically disclosed in the U.S. patent have a low molecular weight of 10,000 or less. And the obtained coating remains unsatisfactory in chipping resistance.

An object of the present invention is to provide a novel electrodepositable coating composition free of the foregoing prior art drawbacks.

Another object of the present invention is to provide a novel electrodepositable coating composition which is capable of forming a coating excellent in chipping resistance and corrosion resistance.

These and other objects of the invention will become more apparent from the following description.

According to the present invention, there is provided a cationic electrodepositable coating composition comprising:

(A) 30 to 1% by weight of a high-molecular-weight polyurethane resin prepared by reacting (a) an organic polyisocyanate, (b) a high-molecular-weight polyol, and (c) a diol having at least one tertiary amino group, the high-molecular-weight polyurethane resin (A) having a SP value of 9.5 to 12.0 and a number average molecular weight of at least 15,000; and (B) 70 to 99% by weight of an epoxy-type cationic electrodepositable resin.

The inventors of the present invention conducted extensive research to develop electrodepositable coating compositions capable of forming coatings with a high resistance to chipping and corrosion without use of a chipping sealer. As a result, the inventors found that the above objects can be achieved by the cationic electrodepositable coating composition comprising the above-specified high-molecular-weight polyurethane resin and the epoxy-type cationic electrodepositable resin, and that a coating having a high resistance to chipping and corrosion can be produced by the composition. The present invention has been completed based on this novel finding.

The high-molecular-weight polyurethane resin (A) used in the cationic electrodepositable coating composition of the invention has a high number average molecular weight and a limited SP value of 9.5 to 12.0 as compared with said conventional urethane elastomers and the like. Because of these characteristics, the resin (A) is improved in the compatibility with the epoxy-type cationic electrodepositable resin (B), and the resulting coating is enhanced in resistance to chipping and corrosion. The diol (c) having a tertiary amino group is used as the essential component of the resin (A) to introduce the tertiary amino group into the main chain, whereby a cationic electrodeposition property is given to the resin (A) to provide a stable electrodeposition bath and improve the electrodeposition efficiency.

The polyurethane resin (A) used in the invention is prepared by reacting (a) an organic polyisocyanate, (b) a high-molecular-weight polyol, (c) a diol having a tertiary amino group, optionally (d) a polymerization terminator and optionally (e) a chain lengthening agent. The polyurethane resin (A) is required to have a SP value of 9.5 to 12.0 and a number average molecular weight of at least 15,000.

The organic polyisocyanate (a) is a compound having at least two free isocyanate groups per molecule. Examples of such compound are various and include aromatic diisocyanates such as tolylene diisocyanate (TDI), diphenylmethane diisocyanate (MDI), p-phenylene diisocyanate, naphthalene diisocyanate, etc.; aliphatic diisocyanates having 2 to 12 carbon atoms such as hexamethylene diisocyanate (HDI), 2,2,4-trimethylhexane diisocyanate, lysine diisocyanate, etc.; alicyclic diisocyanates having 4 to 18 carbon atoms such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidenedicyclohexyl-4,4'-diisocyanate, 1,3-diisocyanatomethylcyclohexane (hydrogenated XDI), etc.; aliphatic diisocyanates having an aromatic ring such as xylylene diisocyanate (XDI), tetramethylxylylenene diisocyanate (TMXDI), etc.; and modified products of these diisocyanates such as urethanized products thereof, modified diisocyanates having carbodiimide, urethidione, urethoimine, biuret and/or isocyanurate groups, etc. These compounds can be used singly or in mixture with each other. Among the above examples, HDI, IPDI, MDI, hydrogenated MDI and TMXDI are preferred.

The high-molecular-weight polyol (b) has at least two hydroxyl groups per molecule and a number average molecular weight of 500 to 5,000, preferably 1,000 to 4,000. Examples of the polyol (b) are set forth below.

(1) Polyether polyols, such as those prepared by polymerization or copolymerization of alkylene oxide (ethylene oxide, propylene oxide, butylene oxide, etc. ) and/or heterocyclic ether (tetrahydrofuran, etc. ) , more specifically such as polyethylene glycol, polypropylene glycol, polyethylene-propylene (blocked or random) ether glycol, polyethylene-tetramethylene ether glycol (blocked or random), polytetramethylene ether glycol, polyhexamethylene ether glycol. etc.

(2) Polyester polyols, such as those prepared by condensation polymerization of aliphatic dicarboxylic acid (e.g., succinic acid, adipic acid, sebacic acid, glutaric acid, azelaic acid, etc.) and/or aromatic dicarboxylic acid (e.g., isophthalic acid, terephthalic acid, etc.) with a low-molecular-weight glycol (e.g., ethylene glycol, propylene glycol, 1,4-butanediol, 1,6-hexanediol, 3-methyl- 1,5-pentanediol, neopentyl glycol, 2,2,4-trimethyl-1,3-pentanediol, 1,4-dihydroxymethylcyclohexane, etc.), more specifically such as polyethylene adipate diol, polybutylene adipate diol, polyhexamethylene adipate diol, polyneopentylene adipate diol, polyethylene/butylene adipate diol, polyneopentyl/hexamethylene adipate diol, poly-3-methylpentylene adipate diol, polybutylene isophthalate diol, etc.

(3) Polylactone polyols, such as polycaprolactone diol or triol, poly-3-methylvalerolactone diol, etc.

(4) Polycarbonate polyols, such as polyhexamethylene carbonate diol, etc.

(5) Polyolefin polyols, such as polybutadiene glycol, polyisoprene glycol or hydrogenated products thereof, etc.

These examples of the component (b) can be used singly or in mixture with each other.

Of the above examples, preferred are at least one of the species (1) and (2), and mixtures of at least one of the species (2) to (5) with the species (1).

The diol (c) having a tertiary amino group is a compound having at least one tertiary amino group and two hydroxyl groups in the molecule and is used to introduce a cationic hydrophilic group which imparts an electrodeposition property to the polyurethane resin (A). Examples of the diol (c) are N-methyldiethanolamine, N-butyldiethanolamine, N-oleyldiethanolamine, N-cyclohexyldiethanolamine, N-methyldiisopropanolamine, N-cyclohexyldiisopropanol, N,N-dihydroxyethylaniline, N,N-dihydroxyethyltoluidine, N,N-dihydroxypropylnaphthylamine, oxyalkylenated alkanolamines prepared by reacting these alkanolamines with a small amount of alkylene oxide such as ethylene oxide and propylene oxide. Of these examples, preferred are N-methyldiethanolamine, N-butyldiethanolamine, and N-oleyldiethanolamine. The amount of the diol (c) containing a tertiary amino group is in a range in which the urethane resin (A) contains 0.1 to 5% by weight, preferably 0.2 to 2% by weight, of nitrogen atom originated in the amino group. Below 0.1% by weight, it is difficult to obtain a stable dispersion suitable for cationic electrodeposition. Above 5% by weight, the hydrophilic property of the polymer is so increased as to reduce the water resistance of the coating.

In preparing the high-molecular-weight polyurethane resin (A) by the reaction of the components (a), (b) and (c), the polymerization terminator (d) and/or the chain-lengthening agent (e) to be described later can be added when so required.

The terminator (d) can be used to adjust the molecular weight of the resin (A) to said range and is a compound having in the molecule at least one active hydrogen atom reactive with an isocyanate group. Specific examples of such compound are low-molecular-weight monohydric alcohols such as methanol, ethanol, isopropanol, butanol, cyclohexanol, etc.; monovalent alkyl monoamines such as mono- and di-ethylamines, mono- and di-butylamines, etc.; and alkanolmonoamines having a primary or a secondary amino group such as mono- and di-ethanolamines, etc.

The amount of the terminator (d) used is in a range which can provide the resin (A) with a number average molecular weight of at least 15,000, preferably at least 20,000, namely in a range sufficient to block less than 0.13 mmol/g, preferably less than 0.10 mmol/g, of the isocyanate group of the isocyanate-terminated prepolymer as the precursor of the resin (A). If the component (d) blocks the isocyanate group in excess of 0.13 mmol/g, it is difficult to provide the resin (A) with a high molecular weight, and a low chipping resistance is imparted to the cationic electrodeposited coating containing the resins (A) and (B) in said weight ratio.

The chain-lengthening agent (e) is a compound having in the molecule at least two active hydrogen atoms reactive with an isocyanate group and is a low-molecular-weight (less than 500 in molecular weight) compound which is free of the components (b) and (c).

Examples of the chain-lengthening agent (e) are water, low-molecular-weight polyols and polyamines. Useful low-molecular-weight polyols include, for example, the glycols exemplified above as useful for preparation of said polyester polyols, adducts of such glycols with a low mole of the alkylene oxide (less than 500 in number average molecular weight); adducts of bisphenol with a low mole of the alkylene oxide (less than 500 in number average molecular weight); trihydric alcohols (e.g., glycerin, trimethylolethane, trimethylolpropane, etc.), adducts of trihydric alcohols with a low mole of the alkylene oxide (less than 500 in number average molecular weight); and mixtures of at least two of these adducts. When a trihydric alcohol is used, the polyol component is preferably 2.05 or less in the number of average hydroxyl groups. In excess of 2.05, the reaction product is prone to gel. Examples of polyamines are aliphatic polyamines such as ethylenediamine, N-hydroxyethylethylenediamine, tetramethylenediamine, hexamethylenediamine, diethylenetriamine, etc.; alicyclic polyamines such as 4,4'-diaminodicyclohexylmethane, 1,4-diaminocyclohexane, isophoronediamine, etc.; aliphatic polyamines having an aromatic ring such as xylylenediamine, tetramethylxylylenediamine, etc.; aromatic polyamines such as 4,4'-diaminodiphenylmethane, tolylenediamine, phenylenediamine, etc.; hydrazines such as hydrazine, carbodihydrazide, adipic acid dihydrazide, sebacic acid dihydrazide, phthalic acid dihydrazide, etc.; mixtures of at least two thereof; etc. Among them, preferred are polyamines. The amount of the chain-lengthening agent (e) used is 5 to 50 mole % preferably 10 to 30 mole %, based on the organic diisocyanate (a).

There is no specific restriction on the process for preparing the high-molecular-weight polyurethane resin (A) by reacting the components (a), (b), (c), optionally components (d) and/or (e). Given below is a listing of typical processes.

(1) A process comprising urethanizing the organic diisocyanate (a), the high-molecular-weight polyol (b), the diol (c) having a tertiary amino group and the polymerization terminator (d) by a one-shot process in the presence or absence of an organic solvent free of an active hydrogen atom in the molecule such as acetone, methyl ethyl ketone, methyl isobutyl ketone, tetrahydrofuran, dioxane, N-methylpyrrolidone, toluene, xylene, mixtures thereof, etc.

(2) A process comprising reacting the organic polyisocyanate (a), the high-molecular-weight polyol (b) and the diol (c) having a tertiary amino group in the presence or the absence of said organic solvent free of an active hydrogen atom in the molecule to give a NCO-terminated urethane prepolymer, reacting the prepolymer with the chain-lengthening agent (e) to lengthen the chain, and then adding the terminator (d) to complete the reaction.

(3) A process wherein a NCO-terminated prepolymer is produced in the same manner as in the process (2) and is mixed at one time with the chain-lengthening agent (e) and the terminator (d) to conduct a chain-lengthening reaction and to complete the reaction.

(4) A process comprising reacting the organic polyisocyanate (a) with the high-molecular-weight polyol (b) in the presence or the absence of said organic solvent free of an active hydrogen atom in the molecule to give a NCO-terminated urethane prepolymer, reacting the prepolymer with the diol (c) having a tertiary amino group and the chain-lengthening agent (e) to lengthen the chain, and then adding the terminator (d) to complete the reaction.

A suitable equivalent ratio of the isocyanate (NCO) group in the component (a) to the total active hydrogen atoms in the components (b) and (c) is in the range of 1.1:1 to 2.0:1, preferably 1.2:1 to 1.8:1. The high-molecular-weight polyurethane resin (A) is prepared such that the equivalent ratio of the NCO group in the component (a) to the total active hydrogen atoms in the active hydrogen-containing compounds other than the component (d) is in the range of about 0.7:1 to about 1.3:1. The reaction for producing the polyurethane is conducted at a temperature of 20° to 150° C., preferably 50° to 120° C. (80° C. or less, preferably 0° to 70° C., in the reaction of polyamine to be used for the chain-lengthening reaction). The amine-type or a tin-type catalyst conventionally used in the urethanization reaction may be employed for the promotion of the reaction.

The resin (A) used in the present invention has a SP value of 9.5 to 12.0, preferably 9.5 to 11.5 and a number average molecular weight of at least 15,000, preferably 20,000 to 200,000.

The abbreviation "SP" used herein stands for a solubility parameter. This parameter can be calculated by the Fedors method which is disclosed, for example, in Polymer Engineering and Science, 14, (2), 147 (1974). When the SP value is less than 9.5, the resin (A) is less compatible with the epoxy-type cationic electrodepositable resin (B) and the corrosion resistance of the coating is reduced. When the SP value exceeds 12.0, the chipping resistance of the coating is not improved.

The SP value of the resin (A) is expressed in a square root of relaxation of cohesive energy density of the components of the polyurethane (relaxation of cohesive energy of molecules/sum of molecule volumes). The organic polyisocyanate (a) has a higher cohesive energy density than the high-molecular-weight polyol (b). Accordingly, the SP value of the resin (A) can be controlled, e.g. can be augmented by increasing the amount of the component (a), or can be reduced by increasing the amount of the component (b).

It is undesirable to use the resin (A) of less than 15,000 in number average molecular weight because it reduces the chipping resistance of the coating.

In the resin (A), a urethanization reaction product of the components (a) and (b) constitutes the main skeleton, a cationic group is introduced therein by the component (c) and the molecular weight of the resin (A) is controlled by the components (d) and (e). By quaternization or salt formation of the cationic group, the resin (A) can be electrodeposited on the substrate along with the resin (B) and is substantially free of dissociation during heat-curing. If an alkanolamine is used as the component (d), it would introduce a primary hydroxyl group into the molecule end of the resin (A) and the hydroxyl group so introduced may participate in crosslinking reaction.

The epoxy-type cationic electrodepositable resin (B) essentially has a cationic group and a crosslinkable functional group (e.g. primary hydroxyl group) and is used in combination with the resin (A). Useful resins include, for example, amino-containing cationic electrodepositable resins having amino groups and conventionally used in the art of cationic electrodepositable coating compositions, and particularly, among them, epoxy-type cationic electrodepositable resins outstanding in compatibility with the resin (A) and in corrosion resistance. Said resins are a water-soluble to water-dispersible resins neutralized with a neutralizing agent, e.g. an acid such as hydrochloric acid, sulfuric acid, phosphoric acid, acetic acid, propionic acid, lactic acid, etc. Specific examples of such resins are (1) an adduct of a polyepoxide compound with a primary monoamine or polyamine, a secondary polyamine or a mixture of primary and secondary polyamines (U.S. Pat. No. 3,984,299); (2) an adduct of a polyepoxide compound with an amine having a ketiminized primary amino group and a secondary amino group (U.S. Pat. No. 4,017,438), (3) an etheric compound prepared by etherifying a polyepoxide compound with a hydroxy compound having a ketiminized primary amino group (Japanese Unexamined Patent Publication No. 43,013/1984).

Polyepoxide compounds which can be used in the preparation of the resin (B) are those containing at least two epoxy groups per molecule and having a number average molecular weight of at least 200, preferably 400 to 4,000, more preferably 800 to 2,000. Preferred is a reaction product of a polyphenol compound with epichlorohydrin.

Polyphenol compounds useful for the preparation of the polyepoxide compound include, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-hydroxyphenyl)methane, tetra(4-hydroxyphenyl)- 1,1,2,2-ethane, 4,4'-dihydroxyphenylsulfone, phenol novolak, cresol novolak, etc.

Useful polyepoxide compounds include those prepared by their partial reaction with a polyol, polyether polyol, polyester polyol, polyamideamine, polycarboxylic acid, polyisocyanate compound or the like and those prepared by graft polymerization with ε-caprolactone, acrylic monomer or the like.

Given below is a listing of representative amino compounds useful as cationic property-imparting agents for introducing a cationic group into the polyepoxide compound:

(i) primary alkanolamines such as monoethanolamine, monopropanolamine, monobutanolamine, etc.;

(ii) secondary alkanolamines such as N-methylethanolamine, N-ethylethanolamine, diethanolamine, di-n(or iso-)propanolamine, dibutanolamine, etc.; and (iii) adducts of said primary alkanolamine with α,β-unsaturated carbonyl compounds (secondary alkanolamine) such as an adduct of monoethanolamine with N,N-dimethylaminopropylacrylamide, adduct of monoethanolamine with hydroxyethyl (meth)acrylate, adduct of monoethanolamine with hydroxypropyl (meth)acrylate, adduct of monoethanolamine with hydroxybutyl (meth)acrylate, etc.

Examples of crosslinkable functional groups, i.e. hydroxyl groups, of the resin (B) are primary hydroxyl groups introduced by, e.g. the alkanolamine in the cationic property-imparting agent, the ring-opened caprolactone in the epoxide compound or a polyol; secondary hydroxyl groups in the epoxy resin; etc. Among them, the primary hydroxyl groups introduced by the alkanolamine are preferred for their high reactivity in curing by crosslinking.

The hydroxyl content of the resin (B) is in the range of 20 to 5,000, preferably 100 to 1,000, in terms of hydroxyl equivalent, desirably 200 to 1,000 in terms of primary hydroxyl equivalent. The reactivity in curing by crosslinking is increased in this hydroxyl content range. The desirable cationic group content of the resin (B) is in a range which can at least stably disperse the resin (B), namely in the range of 3 to 200 mg KOH/g resin, preferably 10 to 100 mg KOH/g resin, in terms of amine value.

The polyurethane resin (A) is used relative to the resin (B) in the cationic electrodepositable coating composition in a weight ratio of resin (A):resin (B) (on solids basis) of 30: 70 to 1: 99, preferably 5: 95 to 20:80. When the amount of the resin (A) is less than in the resin (A):resin (B) weight ratio (on solids basis) of 1:99, the chipping resistance of the coating is not sufficiently improved, whereas when it is more than in the resin (A):resin (B) weight ratio of 30 to 70, various disadvantages are entailed such as poor stability of coating bath, phenomenon of a precipitate remaining in the bottom of the coating bath, decrease of corrosion resistance and increased costs for production of coating compositions. Hence the use of resin (A) outside said quantity range is undesirable.

The electrodepositable coating composition of the present invention may contain, when required, alcohols, phenols, polyisocyanates blocked with tertiary hydroxylamine or oxime, melamine resins and like crosslinking agents.

The electrodepositable coating composition of the present invention may further contain, when required, conventional additives such as coloring pigments, e.g. titanium white, carbon black, red oxide, chrome yellow, etc., extender pigments, e.g. silica, clay, mica, calcium carbonate, talc, etc., corrosion inhibitory pigments, e.g. strontium chromate, zinc chromate and like chrome pigments, lead silicate, lead chromate, lead hydroxide and like lead pigments, resins for dispersing pigments, cissing inhibitors, aqueous solvents, curing catalysts and so on. The pigment is used preferably in the form of a paste in which the pigment is dispersed in a pigment-dispersing resin.

The cationic electrodepositable coating composition of the present invention can be applied to the surface of the desired substrate by cationic electrodeposition coating methods. Conventional coating methods can be employed in the practice of the invention. For example, a coating operation can be carried out as follows. The cationic electrodepositable coating composition of the invention is diluted with deionized water or the like to a solids concentration of about 5 to about 40% by weight, preferably about 15 to 25% by weight, whereby a coating bath is prepared. An article to be coated is dipped as a cathode at a voltage of 100 to 400 V into the coating bath maintained at 15° to 35° C. and adjusted to a pH of 5.5 to 8.0.

The thickness of the coating film formed by the cationic electrodepositable coating composition of the invention is not specifically limited and is in the range of 10 to 50 μm, preferably 15 to 35 μm when cured. The coating is baked for about 10 to about 30 minutes at a temperature of 100° to 200° C., preferably 150° to 180° C.

It remains to be clarified why the cured coating of the composition of the invention is excellent in chipping resistance, corrosion resistance, etc. Presumably the high-molecular-weight polyurethane used as one of the resin components of the composition is so elastic as to improve the chipping resistance of the coating and the suitably selected molecular weight contributes to enhancement of corrosion resistance.

The present invention will be described below in greater detail with reference to the following preparation examples, examples and comparative examples. The invention, however, is not limited to the examples at all. The parts and percentages in the examples are all by weight.

PREPARATION EXAMPLE 1

Preparation of Polyurethane Resins (A)
Preparation of Resin (A-1)

A reactor was charged with 479.2 parts of polyethylenepropylene (blocked) ether glycol (trade name "Sunnixdiol PL- 2100" with a number average molecular weight of 2,477, product of Sanyo Chemical Ind., Ltd.), 39.74 parts of neopentyl glycol, 158.3 parts of hexamethylene diisocyanate and 75 parts of methyl isobutyl ketone. After replacing the air in the reactor with nitrogen gas, the charge was reacted with stirring at a temperature of 110° C. for 3 hours. The reaction mixture was cooled to 60° C. and admixed with 23.78 parts of N-methyldiethanolamine and 225 parts of methyl isobutyl ketone. The mixture was reacted at a temperature of 90° C. for 4 hours, giving a urethane prepolymer having a residual NCO content of 1.30%. The urethane prepolymer was cooled to 40° C. and admixed with a mixture of 22.9 parts of isophoronediamine, 2.44 parts of monoethanolamine, 355 parts of methyl isobutyl ketone and 70 parts of isopropanol. The mixture was reacted to chain-extend until the residual NCO disappeared 1 hour later. The procedure gave a high-molecular-weight polyurethane resin (A-1) as a pale yellow solution having a solids content of 50.0% and a number average molecular weight of about 35,000. The resin (A-1) had an amine value of 15.4 mg KOH/g resin (the content of nitrogen atom originated in the tertiary amino group was 0.39% based on the resin) and a SP value of 9.7 as determined by the Fedors method.

Preparation of Resin (A-2)

A reactor was charged with 483.7 parts of polyethylenetetramethylene (random) ether glycol (2,040 in number average molecular weight) prepared by cationic ring opening polymerization of ethylene oxide/tetrahydrofuran (20/80), 35.20 parts of neopentyl glycol, 23.76 parts of N-methyldiethanolamine, 156.3 parts of hexamethylene diisocyanate and 300 parts of methyl isobutyl ketone. After replacing the air in the reactor with nitrogen gas, the charge was reacted with stirring at a temperature of 90° C. for 8 hours, giving a urethane prepolymer having a residual NCO content of 1.30%. The urethane prepolymer was cooled to 50° C. and admixed with a mixture of 23.7 parts of isophoronediamine, 3.27 parts of diethanolamine, 350 parts of methyl isobutyl ketone and 75 parts of isopropanol. The mixture was reacted to chain-extend until the residual NCO disappeared 1 hour later. The procedure gave a high-molecular-weight polyurethane resin (A-2) as a pale yellow solution having a solids content of 50.1% and a number average molecular weight of about 45,000. The resin (A-2) had an amine value of 15.4 mg KOH/g resin (the content of nitrogen atom originated in the tertiary amino group was 0.39% based on the resin) and a SP value of 9.8 as determined by the Fedors method.

Preparation of Resin (A-3)

A reactor was charged with 458.0 parts of polytetramethylene ether glycol (3,065 in number average molecular weight), 41.42 parts of neopentyl glycol, 175.8 parts of hexamethylene diisocyanate and 75 parts of methyl isobutyl ketone. After replacing the air in the reactor with nitrogen gas, the charge was reacted with stirring at a temperature of 110° C. for 3 hours. The reaction mixture was cooled to 60° C. and admixed with 23.76 parts of N-methyldiethanolamine and 225 parts of methyl isobutyl ketone. The mixture was reacted at a temperature of 90° C. for 3 hours, giving a urethane prepolymer having a residual NCO content of 2.51%. The urethane prepolymer was cooled to 40° C. and admixed with a mixture of 61.5 parts of 4,4'-diaminodicyclohexylmethane, 1.25 parts of diethanolamine, 620 parts of methyl isobutyl ketone and 185 parts of isopropanol. The mixture was reacted to chain-extend until the residual NCO disappeared 1 hour later. The procedure gave a high-molecular-weight polyurethane resin (A-3) as a pale yellow solution having a solids content of 40.8% and a number average molecular weight of about 113,000. The resin (A-3) had an amine value of 16.0 mg KOH/g resin (the content of nitrogen atom originated in the tertiary amino group was 0.40% based on the resin) and a SP value of 10.0 as determined by the Fedors method.

Preparation of Resin (A-4)

A reactor was charged with 479.2 parts of polyethylenepropylene (blocked) ether glycol (trade name "Sunnixdiol PL- 2100" with a number average molecular weight of 2,477, product of Sanyo Chemical Ind., Ltd.), 39.74 parts of neopentyl glycol, 156.3 parts of hexamethylene diisocyanate and 75 parts of acetone. After replacing the air in the reactor with nitrogen gas, the charge was reacted with stirring in the reactor hermetically closed at a temperature of 110° C. for 3 hours. The reaction mixture was cooled to 60° C. and admixed with 23.78 parts of N-methyldiethanolamine and 225 parts of acetone. The mixture was reacted at a temperature of 90° C. for 4 hours, giving a urethane prepolymer having a residual NCO content of 1.30%. The urethane prepolymer was cooled to 40° C. and admixed with a mixture of 22.9 parts of isophoronediamine, 2.44 parts of monoethanolamine, 355 parts of acetone and 70 parts of isopropanol. The mixture was reacted to chain-extend until the residual NCO disappeared 1 hour later. The procedure gave a high-molecular-weight polyurethane resin (A-4) having a number average molecular weight of about 35,000. The resin (A-4) had an amine value of 15.5 mg KOH/g resin (the content of nitrogen atom originated in the tertiary amino group was 0.39% based on the resin) and a SP value of 9.7 as determined by the Fedors method. The polyurethane resin solution thus obtained (500 parts) was charged into a 4necked glass reactor, followed by addition of 41.3 parts of 10% acetic acid. After stirring for 30 minutes, 465 parts of deionized water was added dropwise over a period of about 15 minutes with vigorous stirring to give an emulsion. The acetone and isopropanol were distilled off at reduced pressure, giving an emulsion of a high-molecular-weight polyurethane resin (A-4) having a solids content of about 35.0%.

Preparation of Resin (A-5)

A reactor was charged with 552.2 parts of polypropylene glycol (3,262 in number average molecular weight), 1.92 parts of 3-methyl-1,5-pentanediol, 121.1 parts of hexamethylene diisocyanate and 75 parts of methyl isobutyl ketone. After replacing the air in the reactor with nitrogen gas, the charge was reacted with stirring at a temperature of 110° C. for 3 hours. The reaction mixture was cooled to 60° C. and admixed with 23.76 parts of N-methyldiethanolamine and 7.69 parts of 3-methyl-1,5-pentanediol, 635 parts of methyl isobutyl ketone, and 0.2 part of dibutyltin dilaurate. The mixture was reacted at a temperature of 90° C. for 8 hours, giving a urethane prepolymer having a residual NCO content of 0.07%. After cooling the internal temperature of the system to 40° C., 2.50 parts of diethanolamine was added. The mixture was reacted for 1 hour, whereby the residual NCO was blocked, giving a comparative high-molecular-weight polyurethane resin (A-5) having a solids content of 40.8% and a number average molecular weight of about 60,000. The resin (A-5) had an amine value of 15.8 mg KOH/g resin (the content of nitrogen atom originated in the tertiary amino group was 0.39% based on the resin) and a SP value of 9.2 as determined by the Fedors method.

Preparation of Resin (A-6)

A reactor was charged with 479.2 parts of polyethylenepropylene (blocked) ether glycol (trade name "Sunnixdiol PL- 2100" with a number average molecular weight of 2,477, product of Sanyo Chemical Ind., Ltd.), 39.74 parts of neopentyl glycol, 156.3 parts of hexamethylene diisocyanate and 75 parts of methyl isobutyl ketone. After replacing the air in the reactor with nitrogen gas, the charge was reacted with stirring at a temperature of 110° C. for 3 hours. The reaction mixture was cooled to 60° C. and admixed with 23.76 parts of N-methyldiethanolamine and 225 parts of methyl isobutyl ketone. The mixture was reacted at 90° C. for 4 hours, giving a urethane prepolymer having a residual NCO content of 1.30%. The urethane prepolymer was cooled to 40° C. and mixed with a mixture of 10.17 parts of isophoronediamine, 11.64 parts of monoethanolamine, 350 parts of methyl isobutyl ketone and 35 parts of isopropanol. The mixture was reacted to chain-extend until the residual NCO disappeared 1 hour later. This procedure gave a comparative polyurethane resin (A-6) as a pale yellow solution having a solids content of 51.3% and a number average molecular weight of about 7,400. The resin (A-6) had an amine value of 15.5 mg KOH/g resin (the content of nitrogen atom originated in the tertiary amino group was 0.39% based on the resin) and a SP value of 9.7 as determined by the Fedors method.

Preparation of Resin (A-7)

A reactor was charged with 302.8 parts of poly(1,4-butylene adipate)diol (2,000 in number average molecular weight). The charge was dehydrated at 110° C. and at reduced pressure for 1 hour and was cooled to about 40° C. after which 338.2 parts of diphenylmethane diisocyanate was quickly added. After replacing the air in the reactor with nitrogen gas, the charge was reacted with stirring at 60° C. for 3 hours. The reaction mixture was admixed with a mixture of 34.15 parts of ethylene glycol, 23.7 parts of N-methyldiethanolamine, and 200 parts of methyl isobutyl ketone. The mixture was reacted for 2 hours. The reaction mixture was diluted with 100 parts of N-methylpyrrolidone, giving a urethane prepolymer having a residual NCO content of 3.79%. The urethane prepolymer was cooled to 40° C. and mixed with a mixture of 85.4 parts of 4,4'-diaminodiphenylmethane and 300 parts of N-methylpyrrolidone, and then with a mixture of 4.20 parts of diethanolamine and 380 parts of methyl isobutyl ketone. The mixture was reacted to chain-extend until the residual NCO content disappeared 1 hour later. This procedure gave a high-molecular-weight comparative polyurethane resin (A-7) as a yellow solution having a solids content of 44.8% and a number average molecular weight of about 35,000. The resin (A-7) had an amine value of 14.2 mg KOH/g resin (the content of nitrogen atom originated in the tertiary amino group was 0.36% based on the resin) and a SP value of 12.2 as determined by the Fedors method.

PREPARATION EXAMPLE 2

Preparation of Epoxy-Type Cationic Electrodepositable Resin (B)
Preparation of Resin (B-1)

A flask equipped with a stirrer, thermometer and nitrogen inlet tube and reflux condenser was charged with 518 parts of an epoxy resin prepared by reacting bisphenol A with epichlorohydrin and having a number average molecular weight of 370 and an epoxy equivalent of 185. Bisphenol A (57 parts) and 0.2 part of dimethylbenzylamine were added and the mixture was reacted at 120° C. until the epoxy equivalent reached 250. After the addition of 213 parts of ε-caprolactone and 0.03 part of tetrabutoxy titanium, the mixture was heated to 170° C. after which sampling was conducted with time while maintaining the same temperature. The amount of unreacted ε-caprolactone was traced by the measurement of infrared absorption spectrum. When the reactivity reached 98% or higher, 148 parts of bisphenol A and 0.4 part of dimethylbezylamine were added. The mixture was reacted at 130° C. until the epoxy equivalent reached 936. Then 257.4 parts of methyl isobutyl ketone, 25.6 parts of diethylamine and 68.3 parts of diethanolamine were added. The mixture was reacted at 80° C. for 2 hours and was diluted with 143.4 parts of methyl ethyl ketone, giving an epoxy-polyamine resin (B-1) having a solids content of 72%. The resin had an amine value of 54.5 mg KOH/g resin and a primary hydroxyl equivalent of 500.

EXAMPLES 1 TO 7 AND COMPARATIVE EXAMPLES 1 TO 4

There were mixed together each of the obtained high-molecular-weight polyurethane resins (A-1) to (A-3) and (A 5) to (A-7), the epoxy-type cationic electrodepositable resin (B-1) and hexamethylene diisocyanate blocked with methyl ethyl ketoxime (hereinafter called "HDI blocked product") in the amounts (based on solids, in part by weight) shown later in Table 2. Each mixture was admixed with 1 part of lead acetate and 15 parts of 10% acetic acid. With uniform and then vigorous stirring, 450 parts of deionized water was added dropwise over a period of about 15 minutes, giving a clear emulsion for a cationic electrodepositable coating composition having a solids content of about 35%. A 271 part-portion of the clear emulsion was added with stirring to 62.2 parts of the pigment paste with the formulation shown below in Table 1. The obtained mixture was diluted with deionized water to provide a cationic electrodepositable coating composition with a solids content of about 20%. The amounts of the components are expressed in Table 1 in parts by weight.

TABLE 1

Formulation of Pigment Paste

| Component | Amount |
| --- | --- |
| Epoxy-type resin for dispersion of pigment | 5 |
| Titanium oxide | 20 |
| Carbon black | 0.5 |
| Tin-type curing agent | 2.5 |
| Deionized water | 34.2 |
| Total | 62.2 |

EXAMPLE 8

The above-obtained epoxy-polyamine resin (B-1) and the HDI blocked product were mixed together in a weight ratio of 80/20 (on solids basis). To the mixture were added 1 part of lead acetate and 15 parts of 10% acetic acid. The mixture was uniformly and then vigorously stirred while adding dropwise 450 parts of deionized water over a period of about 15 minutes, giving an emulsion with a solids content of about 35%. The emulsion was mixed with the emulsion of the high-molecular-weight polyurethane resin (A-4) obtained above in a weight ratio of 100/12 (on solids basis), producing a clear emulsion for a cationic electrodepositable coating composition. A 271 part portion of the clear emulsion was admixed with 62.2 parts of the pigment paste of the formulation shown in Table 1 with stirring. The mixture was diluted with deionized water, giving a cationic electrodepositable coating composition having a solids content of about 20%.

An electrodeposition operation was carried out by dipping a zinc phosphate-treated steel panel (cold-rolled, galvanized steel panel of 0.8 mm-thickness) into a coating bath of the obtained cationic electrodepositable coating composition as a cathode at a voltage of 250 V, whereby the steel panel was coated with a coating film having a cured thickness of about 20 μm. The coated panel was washed with water and baked by an electric hot air dryer at 170° C. for 20 minutes to give a coated test panel.

The coated test panel was tested for corrosion resistance and chipping resistance by the following test methods.
Corrosion Resistance The coated test panel of about 20 μm thickness prepared above was cut crosswise to the substrate surface. Then a salt spray resistance test was effected according to JIS Z 2371 for 840 hours. The result was evaluated according to the following criteria.
A: The largest blister or creep developed on one side of the cross cut over a width of less than 2 mm (excellent corrosion resistance).
B: The largest blister or creep developed on one side of the cross cut over a width of 2 to 3 mm (normal degree of corrosion resistance).
C: The largest blister or creep developed on one side of the cross cut over a width of 3 mm or more (poor corrosion resistance).
Chipping Resistance The coated test panel prepared above was further coated as follows. An aminoalkyd-type intermediate coating composition (trade name "AMILAC TP 37 SEALER," product of Kansai Paint Co., Ltd.) was applied to the surface of the coated panel to give a coating film of 25 to 35 μm in cured thickness. The coated panel was heated to 140° C. for 30 minutes for curing. A top coating composition (trade name "NEOAMILAC #6000," product of Kansai Paint Co., Ltd.) was applied to the intermediate coating surface to form a coating film of 30 to 40 μm in cured thickness. The coated panel was heated to 140° C. for 30 minutes for curing, whereby a coated test panel was produced for a chipping resistance test.

The coated test panel was mounted on Q-G-R-Gravelometer (trade name, product of Q Panel Corp.). Fifty grams of No. 7 graded gravel was forced out against the coated test panel at an air pressure of 4 kg/cm² and at a temperature of −20° C. to give a great impact to the coated panel. The result was evaluated according to the following criteria.

A: While the top layer was partially marred and a slight flaking was detected between the top and intermediate layers or between the intermediate and electrodeposited layers, the electrodeposited layer was not peeled off at all. That is, excellent chipping resistance was exhibited.

B: While a slight flaking was found between the top and intermediate layers, between the intermediate and electrodeposited layers or between the electrodeposited layer and the zinc plated substrate, the zinc layer was not peeled off at all. That is, a normal degree of chipping resistance was achieved.

C: Layers were peeled off in numerous parts of the coating, and the zinc layer was peeled off in a pronounced degree. That is, poor chipping resistance was exhibited.

The result is shown in Table 2.

TABLE 2

|  |  |  | Example | | | | | | | |
|---|---|---|---|---|---|---|---|---|---|---|
|  |  |  | 1 | 2 | 3 | 4 | 5 | 6 | 7 | 8 |
| Ingredient | High-molecular-weight polyurethane resin (A) | Kind Amount | (A-1) 5 | (A-1) 8 | (A-1) 12 | (A-1) 16 | (A-1) 20 | (A-2) 12 | (A-3) 12 | (A-4) 12 |
|  | Epoxy-polyamine resin (B-1) |  | 80 | 80 | 80 | 80 | 80 | 80 | 80 | 80 |
|  | HDI blocked product |  | 20 | 20 | 20 | 20 | 20 | 20 | 20 | 20 |
|  | Pigment paste |  | 28 | 28 | 28 | 28 | 28 | 28 | 28 | 28 |
| Test results | Corrosion resistance |  | A | A | A | A | A | A | A | A |
|  | Chipping resistance |  | A | A | A | A | A | A | A | A |

|  |  |  | Comparative Example | | | |
|---|---|---|---|---|---|---|
|  |  |  | 1 | 2 | 3 | 4 |
| Ingredient | High-molecular-weight polyurethane resin (A) | Kind Amount | (A-5) 20 | (A-6) 20 | (A-7) 20 | — — |
|  | Epoxy-polyamine resin (B-1) |  | 80 | 80 | 80 | 80 |
|  | HDI blocked product |  | 20 | 20 | 20 | 20 |
|  | Pigment paste |  | 28 | 28 | 28 | 28 |
| Test results | Corrosion resistance |  | C | B | A | A |
|  | Chipping resistance |  | B | C | C | C |

We claim:

1. A cationic electrodepositable coating composition comprising:
   (A) 30 to 1% by weight of a high-molecular-weight polyurethane resin prepared by reacting (a) an organic polyisocyanate, (b) a high-molecular-weight polyol, and (c) a diol having a tertiary amino group, the high-molecular-weight polyurethane resin (A) having a solubility parameter value of 9.5 to 12.0 as calculated by the Fedors method and a number average molecular weight of 20,000 to 200,000; and
   (B) 70 to 99% by weight of an epoxy cationic electrodepositable resin.

2. A cationic electrodepositable coating composition according to claim 1 wherein the high-molecular-weight polyurethane resin (A) is one prepared using a polymerization terminator (d) and/or a chain lengthening agent (e) in addition to the components (a) to (c).

3. A cationic electrodepositable coating composition according to claim 2 wherein the chain lengthening agent (e) is a polyamine.

4. A cationic electrodepositable coating composition according to claim 1 wherein the high-molecular-weight polyurethane resin (A) has a solubility parameter value of 9.5 to 11.5.

5. A cationic electrodepositable coating composition according to claim 1 wherein the high-molecular-weight polyurethane resin (A) contains 0.1 to 5% by weight of nitrogen atom originated in the tertiary amino group of the diol (c).

6. A cationic electrodepositable coating composition according to claim 1 wherein the diol (c) is N-alkyldiethanolamine.

7. A cationic electrodepositable coating composition according to claim 1 wherein the polyisocyanate (a) is an aliphatic or alicyclic diisocyanate.

8. A cationic electrodepositable coating composition according to claim 1 wherein the cationic electrodepositable resin (B) is 20 to 5,000 in hydroxyl equivalent.

9. A cationic electrodepositable coating composition according to claim 1 wherein the cationic electrodepositable resin (B) is 200 to 1,000 in primary hydroxyl equivalent.

10. A cationic electrodepositable coating composition according to claim 1 which the cationic electrodepositable resin (B) has an amine value of 3 to 200.

11. A cationic electrodepositable coating composition according to claim 1 which further contains a crosslinking agent.

12. A cationic electrodepositable coating composition according to claim 11 wherein the crosslinking agent is blocked polyisocyanate or melamine resin.

* * * * *